(12) United States Patent
Kitagawa et al.

(10) Patent No.: US 10,199,972 B2
(45) Date of Patent: Feb. 5, 2019

(54) CONTROL DEVICE FOR AN ELECTRIC MOTOR

(71) Applicant: Mitsubishi Electric Corporation, Tokyo (JP)

(72) Inventors: Jun Kitagawa, Tokyo (JP); Yasufumi Ogawa, Tokyo (JP); Daiki Matsuura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/888,162

(22) Filed: Feb. 5, 2018

(65) Prior Publication Data

US 2018/0309399 A1 Oct. 25, 2018

(30) Foreign Application Priority Data

Apr. 21, 2017 (JP) ................................. 2017-084264

(51) Int. Cl.
*H02P 6/00* (2016.01)
*H02P 21/22* (2016.01)

(52) U.S. Cl.
CPC .................................. *H02P 21/22* (2016.02)

(58) Field of Classification Search
CPC .......... H02P 21/22; H02P 27/12; H02P 29/00; H02P 21/00
USPC ........................ 318/400.02, 599, 400.17, 801
See application file for complete search history.

(56) References Cited

U.S. PATENT DOCUMENTS

| | | | | |
|---|---|---|---|---|
| 2008/0309265 | A1* | 12/2008 | Terada | H02P 21/06 318/400.02 |
| 2011/0062902 | A1* | 3/2011 | Patel | H02P 6/185 318/400.02 |
| 2016/0276971 | A1* | 9/2016 | Thyagarajan | H02P 23/30 |
| 2017/0288588 | A1* | 10/2017 | Tachibana | H02P 21/22 |
| 2017/0294864 | A1* | 10/2017 | Tada | H02P 29/50 |

FOREIGN PATENT DOCUMENTS

| | | |
|---|---|---|
| JP | 5252229 B2 | 7/2013 |
| JP | 6132948 B1 | 5/2017 |

* cited by examiner

*Primary Examiner* — Jorge L Carrasquillo
(74) *Attorney, Agent, or Firm* — Sughrue Mion, PLLC; Richard C. Turner (57) ABSTRACT

In a control device for an electric motor (101), a three-phase/two-phase conversion section (203) outputs N d-axis current values and N q-axis current values in each measurement period that is 1/N of a carrier period. An average value calculation section (204) calculates average values of those values. A difference calculation section (205) calculates a difference between a k-th d-axis current value and the average value of the d-axis current values as a d-axis current difference, and calculates a difference between a k-th q-axis current value and the average value of the q-axis current values as a q-axis current difference. A filtering section (206) performs low-pass filtering on each difference, and outputs d-axis and q-axis current correction values. A correction calculation section (207) performs a linear operation of each k-th current value and the corresponding current correction value, and outputs the corrected current values.

6 Claims, 7 Drawing Sheets

CONTROL DEVICE FOR AN ELECTRIC MOTOR

BACKGROUND OF THE INVENTION

1. Field of the Invention

The present invention relates to a control device for an electric motor, and more particularly, to a control device for an electric motor configured to perform current feedback control for an electric motor including an inverter.

2. Description of the Related Art

A control device for an electric motor that has been known until now is configured to detect a current value of a three-phase line between an electric motor and an inverter and a rotational position of a rotor of the electric motor with use of various sensors, and to perform current feedback control so that a torque follows a target value. At this time, the control device controls the inverter by PWM control, and controls the current feedback control with use of vector control. In use of the vector control, a three-phase current value detected by a current sensor, which is provided on the three-phase alternating current side of the inverter, is converted to a d-axis current and a q-axis current in a rotating coordinate system in synchronization with the rotational position of the rotor of the electric motor.

It is known that in detection of a three-phase current value by, for example, a microcomputer, at a particular period, aliasing occurs in a detected current value when the detection period matches a harmonic component (for example, 5th order, 7th order, 11th order, 13th order, 17th order, or 19th order) of a fundamental frequency of an electric motor, which is superimposed on the three-phase current.

To cope with this, there is a method for reducing the influence of aliasing by performing current detection an increased number of times (for example, Japanese Patent No. 5252229). In the technology described in Japanese Patent No. 5252229, a plurality of currents that are detected with a carrier period and a period that is half of the carrier period are averaged to reproduce an actual current value, which has not been affected by aliasing.

The related art, however, has a problem in that the influence of aliasing cannot be reduced in some cases.

For example, with the technology described in Japanese Patent No. 5252229, the average value of currents can be obtained, but the average value alone can be applied to merely a few controls, with the result that the influence of aliasing cannot be reduced in some cases.

SUMMARY OF THE INVENTION

The present invention has been made in order to solve the problem described above, and has an object to provide a control device for an electric motor that can more appropriately reduce the influence of aliasing.

According to one embodiment of the present invention, there is provided a control device for an electric motor, including: a drive control unit, which is configured to control an inverter configured to supply electric power to an electric motor, to thereby control drive of the electric motor; a rotation angle detection sensor, which is configured to detect a rotational position of the electric motor; and a current detection sensor, which is configured to detect, in each of three phases, a current value of a current that is supplied to the electric motor, the drive control unit including: a current control unit, which is configured to perform feedback control so that the detected current value follows a current command value; information storage unit for storing a first control period that is equal to a carrier period including a switching period of the inverter, and a second control period that is 1/N (N is an integer of 2 or more) of the first control period; a measurement control unit, which is configured to obtain a three-phase current value of the inverter and the rotational position of the electric motor in each second control period; and a current processing unit, which is configured to perform calculation related to the current value, the current processing unit including: a three-phase/two-phase conversion section, which is configured to perform three-phase/two-phase conversion on the three-phase current value and the rotational position that include successive N three-phase current values obtained with the second control period and successive N rotational positions obtained with the second control period, respectively, to output N d-axis current values and N q-axis current values; an average value calculation section, which is configured to calculate an average value of the N d-axis current values and an average value of the N q-axis current values; a difference calculation section, which is configured to: calculate, as a d-axis current difference, a difference between a k-th d-axis current value (k is an integer satisfying $1 \leq k \leq N$) of the N d-axis current values that is obtained at a timing corresponding to the first control period, and the average value of the N d-axis current values; and calculate a difference between a k-th q-axis current value of the N q-axis current values, and the average value of the N q-axis current values as a q-axis current difference; a filtering section, which is configured to perform low-pass filtering on the d-axis current difference and the q-axis current difference to output a d-axis current correction value and a q-axis current correction value; and a correction calculation section, which is configured to: perform a linear operation of the k-th d-axis current value and the d-axis current correction value to output the corrected d-axis current value; and perform a linear operation of the k-th q-axis current value and the q-axis current correction value to output the corrected q-axis current value.

According to a specific mode of the present invention, the drive control unit further includes a PWM control method selection unit, which is configured to perform PWM control on the inverter, to thereby control the electric motor, and the current control unit is configured to perform control based on control performed by the PWM control method selection unit.

According to a specific mode of the present invention, the PWM control method selection unit is configured to calculate N based on at least one of a number of the carrier periods per fundamental wave period of the electric motor or a rotation speed of the electric motor.

According to a specific mode of the present invention, the low-pass filtering achieves responsiveness that is lower than responsiveness of the current control unit.

According to the control device for an electric motor of the present invention, it is possible to more appropriately reduce the influence of aliasing.

DESCRIPTION OF THE EMBODIMENTS

Now, an embodiment of the present invention is described with reference to the accompanying drawings.

First Embodiment

Figure 1:
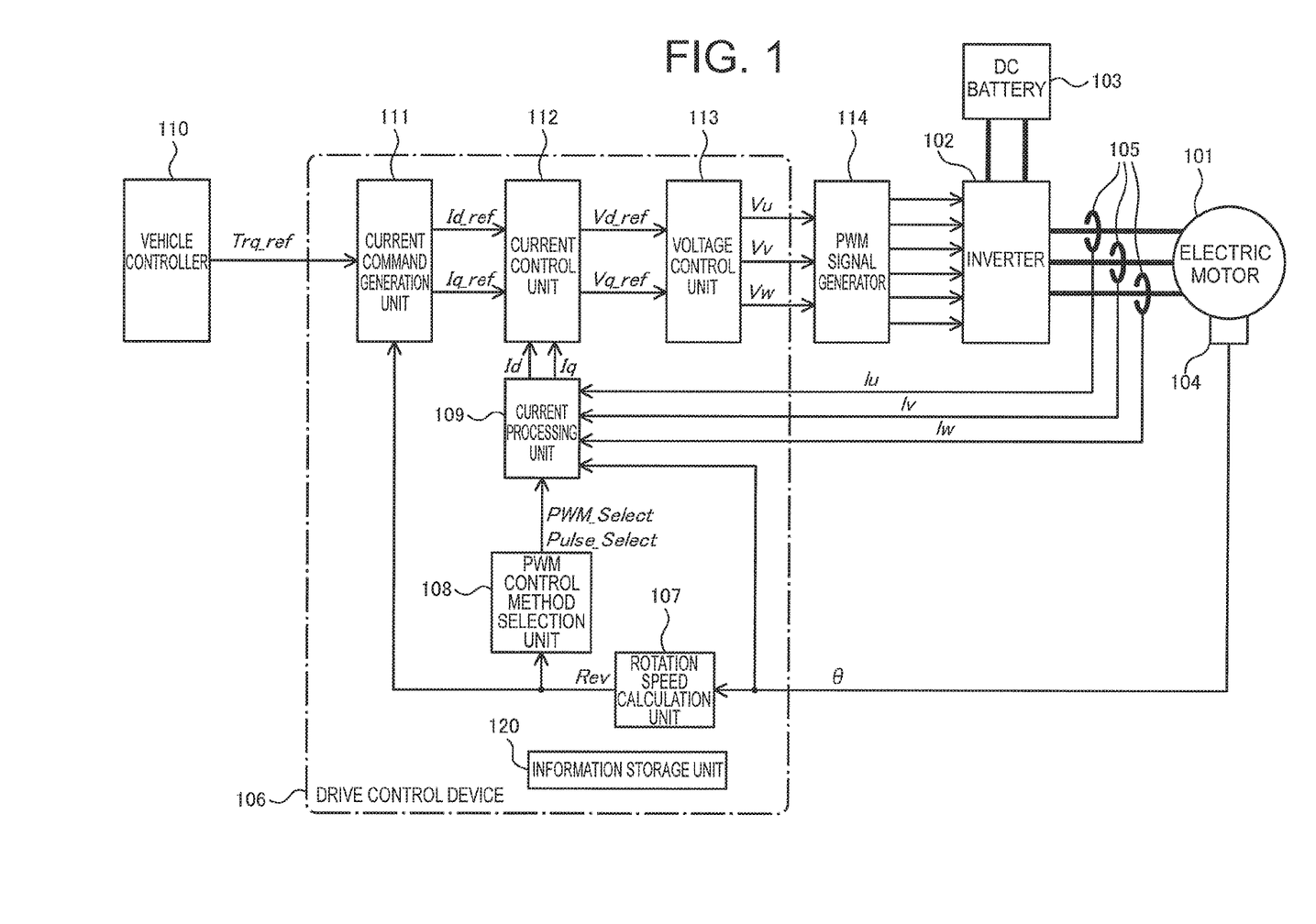
FIG. 1 is a schematic block diagram for illustrating a configuration including a drive control device for an electric motor of a first embodiment of the present invention.

FIG. 1 is a schematic block diagram for illustrating a configuration including an electric motor 101 and a control device therefor according to a first embodiment of the present invention. The electric motor 101 and the control device therefor according to the first embodiment are to be used in an electric vehicle, but the present invention can be applied to any industrial product including an electric motor and an inverter, in addition to the electric vehicle. For example, the present invention may be applied to a hybrid vehicle or an elevator.

The electric motor 101 receives, as its input, AC power output from an inverter 102, which is described later, and outputs a shaft torque. In the first embodiment, the output shaft of the electric motor 101 is connected to a final gear (not shown). Tires (not shown) are driven via the final gear, leading to the movement of a vehicle.

The inverter 102 converts DC power output from a DC battery 103, which is described later, to AC power, and supplies the converted electric power to the electric motor 101. The inverter 102 includes, for example, six switching elements (for example, IGBTs), and operates based on a switching signal calculated by a PWM signal generator 114 to be ON or OFF.

The DC battery 103 is constructed of, for example, a lithium ion battery having a rated output of 100 V.

The control device for the electric motor 101 includes a resolver 104 connected to the electric motor 101. The resolver 104 is a rotation angle detection sensor configured to detect a rotational position of the electric motor 101 (for example, a rotation angle of a rotor). The resolver 104 outputs a detected rotational position as a resolver angle θ.

The electric motor 101 is a three-phase electric motor, and the control device for the electric motor 101 includes current sensors 105 provided for the respective phases of the electric motor 101. The current sensor 105 is a current detection sensor configured to detect a current value of a current that is supplied to the electric motor 101 in each of the three phases. As a current that is supplied to the electric motor 101, the values of currents in the three phases that flow to the motor are herein represented by Iu, Iv, and Iw. Further, a set (vector) of those values of currents in the three phases is represented by Iuvw. In the first embodiment, one current sensor 105 is provided for each phase, that is, three current sensors 105 are provided in total. Even in a case in which two current sensors are provided in total, however, an effect substantially similar to that in the case of detecting the current values of currents that are supplied to the electric motor 101 in the respective three phases can be obtained.

The control device for the electric motor 101 includes a drive control device 106. The drive control device 106 is a drive control unit configured to control the inverter 102, to thereby control the drive of the electric motor 101. The drive control device 106 is constructed of a computer that includes a processor and a memory (may also include information storage unit 120 described later), for example. With the processor and the memory cooperating with each other, the drive control device 106 executes the processing described herein, to thereby achieve functions described herein.

The drive control device 106 calculates voltage command values Vu, Vv, and Vw based on a torque command value Trq_ref from a vehicle controller 110, the resolver angle θ output from the resolver 104, and the three-phase current value Iuvw detected by the current sensors 105. The voltage command values Vu, Vv, and Vw are command values serving as a reference of the switching signal.

In the first embodiment, the drive control device 106 includes a rotation speed calculation unit 107 (the rotation speed calculation unit 107 may be provided outside the drive control device 106 in a modification example of the present invention). The rotation speed calculation unit 107 calculates a rotation speed Rev of the electric motor 101 (for example, a rotation speed of the rotor) based on a change in resolver angle θ per unit of time.

In the first embodiment, the drive control device 106 includes a PWM control method selection unit 108 (the PWM control method selection unit 108 may be provided outside the drive control device 106 in a modification example of the present invention). The PWM control method selection unit 108 selectively determines whether to perform non-synchronized PWM control or synchronized PWM control, based on the rotation speed Rev of the electric motor 101. The PWM control method selection unit 108 outputs a signal (PWM control method signal) PWM_Select indicating which of the controls is selected. When determining to perform the synchronized PWM control, the PWM control method selection unit 108 determines a first control period. The first control period is equal to a carrier period, for example.

The carrier period is a period that is determined based on a fundamental wave period of the electric motor 101, and is a switching period of the inverter 102. The carrier period may be determined as a period that is 1/M (M is a positive integer) of the fundamental wave period of the electric motor 101, for example. The value of M may be a constant or a variable that is calculated or determined based on the rotation speed Rev or other conditions.

The PWM control method selection unit 108 outputs a signal indicating the carrier period, which is determined in this way. In the first embodiment, this signal is a control pulse number signal Pulse_Select indicating the number of control pulses included in one fundamental wave period of the electric motor 101.

In this way, the PWM control method selection unit 108 determines whether to perform the control based on the carrier period, and determines the carrier period when determining to perform the control based on the carrier period.

The drive control device 106 includes a current processing unit 109. The current processing unit 109 performs control based on control performed by the PWM control method selection unit 108. For example, the current processing unit 109 obtains the values Iu, Iv, and Iw of currents in the respective phases that flow to the electric motor 101, and the resolver angle θ at a processing timing based on a control method selected by the PWM control method selection unit 108 (for example, in each measurement period obtained by further dividing the carrier period, as described later). Further, the current processing unit 109 calculates and outputs a d-axis current value Id and a q-axis current value Iq.

In the first embodiment, the control device for the electric motor 101 includes the vehicle controller 110. The vehicle controller 110 determines the torque command value Trq_ref, which is output to the electric motor 101, through calculation, for example, based on operation performed by a driver via an accelerator and the speed of the vehicle.

In the first embodiment, the drive control device 106 includes a current command generation unit 111 (the current command generation unit 111 may be provided outside the drive control device 106 in a modification example of the present invention). The current command generation unit 111 calculates, based on the torque command value Trq_ref and the rotation speed Rev, a d-axis current command value Id_ref and a q-axis current command value Iq_ref with which the torque command value Trq_ref can be output.

The drive control device 106 includes a current control unit 112. The current control unit 112 performs calculation related to a current value based on control executed by the PWM control method selection unit 108. In particular, the current control unit 112 performs current control calculation so that the d-axis current value Id and the q-axis current value Iq follow the d-axis current command value Id_ref and the q-axis current command value Iq_ref, respectively, to thereby calculate and output a d-axis voltage command value Vd_ref and a q-axis voltage command value Vq_ref. This operation is equivalent to performing feedback control so that the current values Iu, Iv, and Iw detected by the current sensors 105 follow the d-axis current command value Id_ref and the q-axis current command value Iq_ref.

In the first embodiment, the drive control device 106 includes a voltage control unit 113 (the voltage control unit 113 may be provided outside the drive control device 106 in a modification example of the present invention). The voltage control unit 113 converts the d-axis voltage command value Vd_ref and the q-axis voltage command value Vq_ref, which are output from the current control unit 112, to the three-phase voltage command values Vu, Vv, and Vw, and outputs the three-phase voltage command values Vu, Vv, and Vw.

The control device for the electric motor 101 includes the PWM signal generator 114. The PWM signal generator 114 generates and outputs a switching signal for the inverter 102 based on the three-phase voltage command values Vu, Vu, and Vw.

The drive control device 106 includes the information storage unit 120. The information storage unit 120 includes a storage medium, for example, a semiconductor or a hard disk, and stores information that is handled in the drive control device 106.

Figure 2:
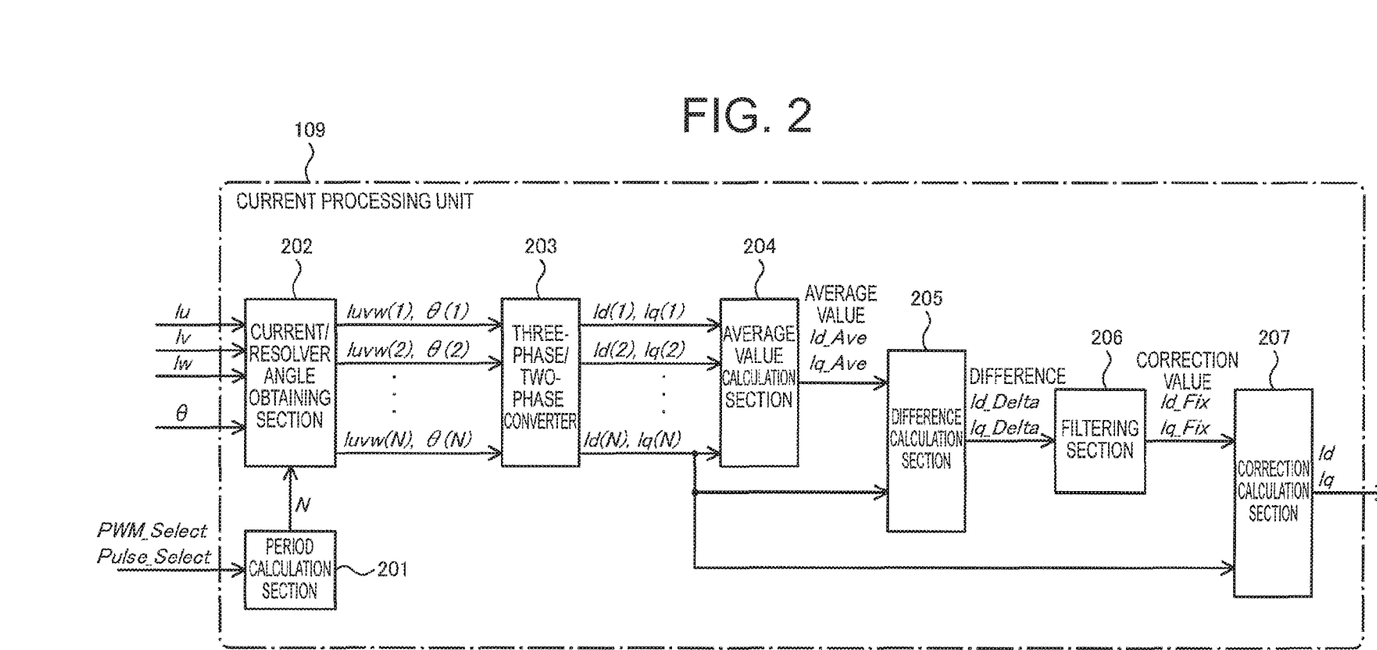
FIG. 2 is a block diagram for illustrating the configuration of a current processing unit of FIG. 1 in more detail.

FIG. 2 is a block diagram for illustrating the configuration of the current processing unit 109 in more detail. In the first embodiment, the current processing unit 109 includes a period calculation section 201 (the period calculation section 201 may be provided outside the current processing unit 109 in a modification example of the present invention). The period calculation section 201 calculates or determines a carrier period division number N (N is an integer of two or more). In the first embodiment, N is calculated or determined based on the PWM control method signal PWM_Select and the control pulse number signal Pulse_Select, which are output from the PWM control method selection unit 108.

In the first embodiment, the current processing unit 109 includes a current/resolver angle obtaining section 202 (the current/resolver angle obtaining section 202 may be provided outside the current processing unit 109 (and inside the drive control device 106) in a modification example of the present invention). The current/resolver angle obtaining section 202 functions as a measurement control unit configured to obtain the three-phase current values Iu, Iv, and Iw of the inverter 102 and the resolver angle θ of the electric motor 101 in each given measurement period (second control period). The current/resolver angle obtaining section 202 obtains those values by receiving measurement signals output from the current sensors 105 and the resolver 104, for example. The measurement period is determined based on the carrier period division number N output from the period calculation section 201, for example. More specifically, the measurement period is 1/N of the carrier period.

When the carrier period division number N=3 is selected, for example, the current/resolver angle obtaining section 202 divides the carrier period into three, and obtains the three-phase current values Iu, Iv, and Iw and the resolver angle θ in each measurement period that is ⅓ of the carrier period. The current processing unit 109 takes in the three-phase current values Iu, Iv, and Iw and the resolver angle θ in this way. Here, U-phase current values measured at N measurement timings that appear in each measurement period are each represented by Iu(n) (n is an integer satisfying 1≤n≤N). In the same manner, V-phase current values are each represented by Iv(n), W-phase current values are each represented by Iw(n), and resolver angles are each represented by θ(n).

In the following description, a value of Iu(n), a value of Iv(n), a value of Iw(n), and a value of θ(n) that are obtained at the earliest timings of measurement timings included in the same carrier period (except for the start point of the carrier period) are represented by Iu(1), Iv(1), Iw(1), and θ(1), respectively. That is, Iu(N), Iv(N), Iw(N), and θ(N) represent values obtained at the end point of the carrier period.

The information storage unit 120 (FIG. 1) stores the carrier period and the measurement period. The information storage unit 120 may store, for example, the values of M and N or the lengths of time corresponding to the values.

The current processing unit 109 includes a three-phase/two-phase converter 203 (three-phase/two-phase conversion section). The three-phase/two-phase converter 203 performs three-phase/two-phase conversion on the N three-phase current values Iu(n), Iv(n), and Iw(n), and the N resolver angles θ(n), which are successive values obtained in each measurement period, and outputs N d-axis current values Id(n) and N q-axis current values Iq(n). The three-phase/two-phase conversion is performed with use of the following expression, for example.

$$\begin{bmatrix} I_{d(n)} \\ I_{q(n)} \end{bmatrix} = \sqrt{\frac{2}{3}} \begin{bmatrix} \cos\theta_{(n)} & \cos\left(\theta_{(n)} - \frac{2}{3}\pi\right) & \cos\left(\theta_{(n)} + \frac{2}{3}\pi\right) \\ -\sin\theta_{(n)} & -\sin\left(\theta_{(n)} - \frac{2}{3}\pi\right) & -\sin\left(\theta_{(n)} + \frac{2}{3}\pi\right) \end{bmatrix} \begin{bmatrix} I_{u(n)} \\ I_{v(n)} \\ I_{w(n)} \end{bmatrix}$$

The current processing unit 109 includes an average value calculation section 204. The average value calculation section 204 calculates the average value of the N d-axis current values Id(n), and the average value of the N q-axis current values Iq(n), and outputs an average d-axis current value Id_Ave and an average q-axis current value Iq_Ave. When the carrier period division number N=3 is selected, for example, the average d-axis current value Id_Ave is obtained as follows:

$$Id\_Ave=(\tfrac{1}{3})\times\{Id(1)+Id(2)+Id(3)\}.$$

The average q-axis current value Iq_Ave is also obtained in the same manner.

The current processing unit 109 includes a difference calculation section 205. The difference calculation section 205 calculates a difference between an N-th d-axis current value Id(N) of the N d-axis current values Id(n), which are output from the three-phase/two-phase converter 203, and the average d-axis current value Id_Ave, which is output from the average value calculation section 204. Further, the difference calculation section 205 calculates a difference between an N-th q-axis current value Iq (N) of the N q-axis current values Iq(n) and the average q-axis current value Iq_Ave, which is output from the average value calculation section 204. Then, the difference calculation section 205 outputs a d-axis current difference Id_Delta and a q-axis current difference Iq_Delta that represent the respective differences. When the carrier period division number N=3 is selected, for example, the d-axis current difference Id_Delta is expressed as follows:

$$Id\_Delta=Id\_Ave-Id(3).$$

The q-axis current difference Iq_Delta is also expressed in the same manner.

In the example described above, the differences are calculated based on the d-axis current value Id(N) and the q-axis current value Iq(N), which are obtained last, but current values to be used as references are changed depending on the definitions of the start point and the end point of the carrier period. More generally speaking, the difference calculation section 205 calculates, as the d-axis current difference Id_Delta, a difference between the average d-axis current value Id_Ave and a d-axis current value of the N d-axis current values Id(n) that is obtained at a timing corresponding to the carrier period (a periodic timing having the same period as the carrier period, for example, a timing at which the current derivative of the control pulse changes from a negative value or zero to a positive value, a timing at which the current derivative of the control pulse changes from a positive value or zero to a negative value, or other timings) (this d-axis current value is referred to as "k-th d-axis current value Id(k)", where k is an integer satisfying 1≤k≤N, and is N in the specific example described above). Further, the difference calculation section 205 calculates a difference between the average q-axis current value Iq_Ave and a k-th q-axis current value Iq(k) of the N q-axis current values Iq(n) as the q-axis current difference Iq_Delta.

The current processing unit 109 includes a filtering section 206. The filtering section 206 performs low-pass filtering (for example, primary low-pass filtering) on the d-axis current difference Id_Delta and the q-axis current difference Iq_Delta, which are output from the difference calculation section 205, and outputs a d-axis current correction value Id_Fix and a q-axis current correction value Iq_Fix. In a strict sense, the filtering section 206 performs the low-pass filtering on a time series value of the d-axis current difference Id_Delta and a time series value of the q-axis current difference Iq_Delta, to thereby obtain a time series value of the d-axis current correction value Id_Fix and a time series value of the q-axis current correction value Iq_Fix. The low-pass filtering may be set to achieve responsiveness that is lower than the responsiveness of the current control unit 112. In this case, influence on the control response of current feedback control in the current control unit 112 can be reduced.

The current processing unit 109 includes a correction calculation section 207. The correction calculation section 207 subjects a d-axis current Id(k) and a q-axis current Iq(k) of the N d-axis currents Id(n) and the N q-axis currents Iq(n), which are output from the three-phase/two-phase converter 203, to correction calculation with the d-axis current correction value Id_Fix and the q-axis current correction value Iq_Fix, which are output from the filtering section 206. Here, the d-axis current Id(k) and the q-axis current Iq(k) are obtained with a carrier period that is the same as the processing timing of the current control unit 112 (or is closest to the timing). Then, the correction calculation section 207 outputs the corrected d-axis current Id and the corrected q-axis current Iq. When the carrier period division number N=3 is selected, and the execution period of the current control unit 112 is the same as the carrier period, for example, the d-axis current value Id is expressed as follows:

$$Id=Id(3)+Id\_Fix.$$

The q-axis current value Iq is expressed in the same manner.

More generally speaking, the correction calculation section 207 performs a linear operation of the k-th d-axis current value Id(k) and the d-axis current correction value Id_Fix (the linear operation, which is addition in the example described above, may be subtraction or other linear operations), and outputs the corrected d-axis current value Id. Further, the correction calculation section 207 performs a linear operation of the k-th q-axis current value Iq(k) and the q-axis current correction value Iq_Fix (the linear operation, which is addition in the example described above, may be subtraction or other linear operations), and outputs the corrected q-axis current value Iq.

Figure 3:
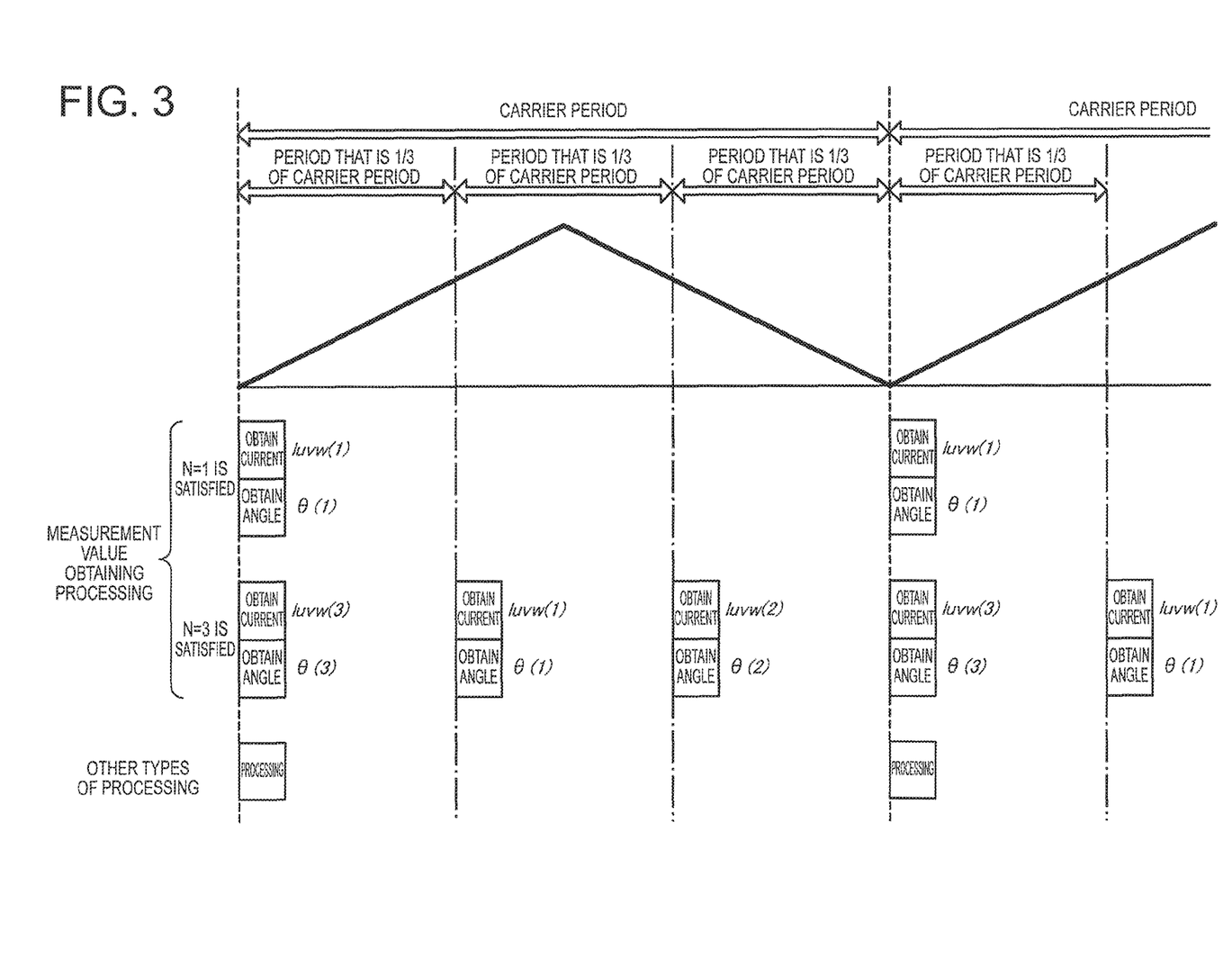
FIG. 3 is a chart for illustrating timings at which a current/resolver angle obtaining section of FIG. 2 obtains a measurement value.

FIG. 3 is a chart for illustrating timings at which the current/resolver angle obtaining section 202 obtains a measurement value. In particular, in FIG. 3, there are illustrated timings at which the current/resolver angle obtaining section 202 obtains the three-phase current value Iuvw and the resolver angle θ, and the period of other types of processing (for example, the processing by the three-phase/two-phase converter 203, the average value calculation section 204, the difference calculation section 205, the filtering section 206, and the correction calculation section 207).

For example, in a comparative example in which the carrier period division number N=1 is satisfied, which is not included in the present invention, the three-phase current value Iuvw and the resolver angle θ are only obtained in each carrier period. When the carrier period division number N=3 is satisfied as in the present invention, on the other hand, the three-phase current value Iuvw and the resolver angle θ are obtained in each measurement period, which is ⅓ of the carrier period.

In the first embodiment, the N three-phase current values Iuvw(n) and the N resolver angles θ(n), which are obtained by the current/resolver angle obtaining section 202, are subjected to the processing from the processing by the three-phase/two-phase converter 203 to the processing by the correction calculation section 207 at once. The series of those processing, however, may be performed in each carrier period or may be performed with a period that is longer than the carrier period, for example.

Figure 4:
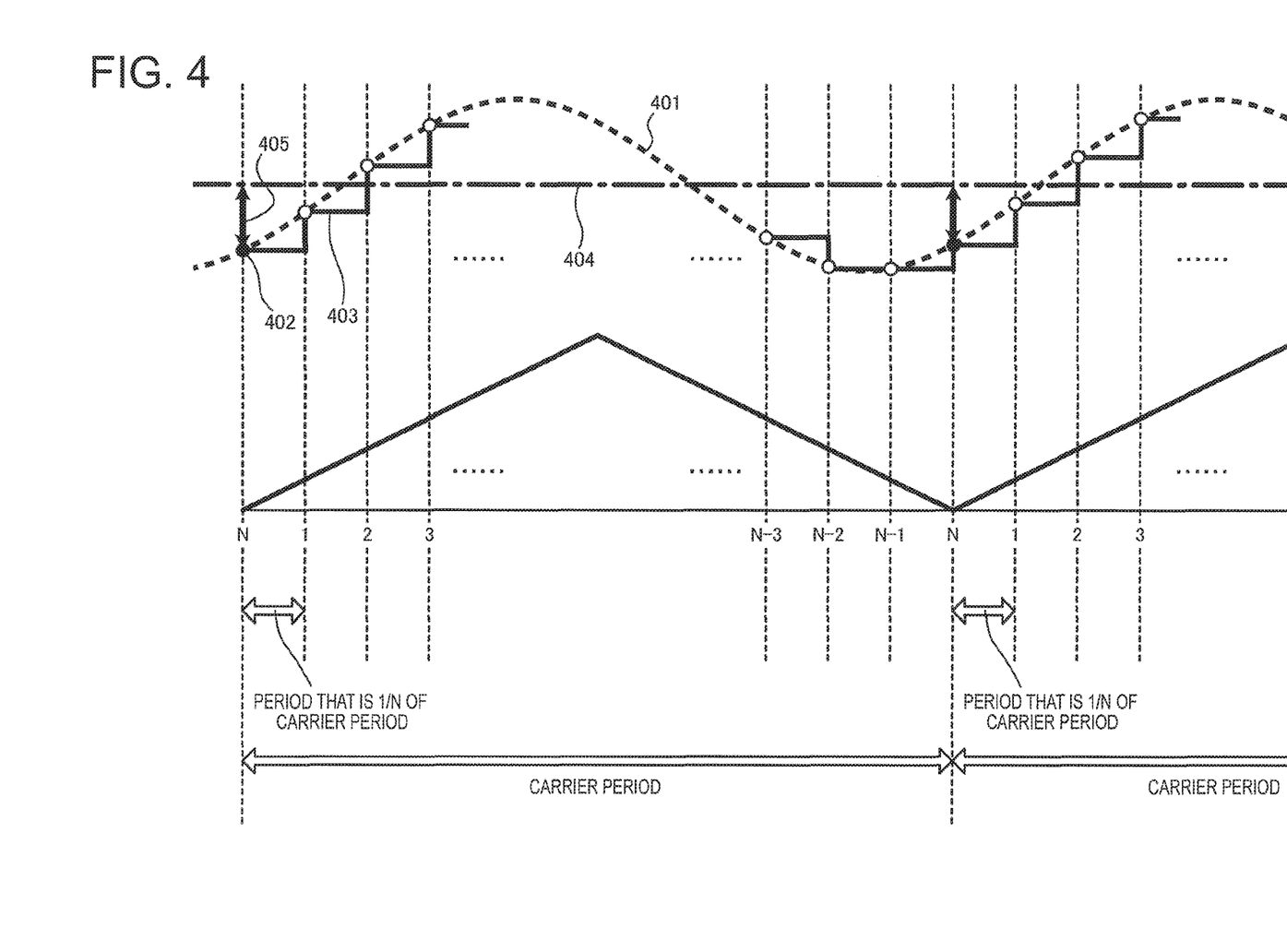
FIG. 4 is a chart for illustrating a relationship between a d-axis current obtained by the current/resolver angle obtaining section of FIG. 2 with a carrier period, and a d-axis current obtained by the current/resolver angle obtaining section with a period that is 1/N of the carrier period.

FIG. 4 is a chart for illustrating a relationship between a d-axis current obtained by the current/resolver angle obtaining section of FIG. 2 with the carrier period, and a d-axis current obtained by the current/resolver angle obtaining section with a period that is 1/N of the carrier period. FIG. 4 is an illustration of an example of the calculation processing for the N d-axis current values and the N q-axis current values in the average value calculation section 204 and the difference calculation section 205. A harmonic component that is 6 times as large as the fundamental frequency of the electric motor is superimposed on the d-axis currents in this example. The example in FIG. 4 is a case in which the rotation speed of the electric motor 101 is high, and the period of the d-axis current on which the harmonic component is superimposed matches the carrier period. It is generally said that harmonics due to the fundamental frequency of the electric motor, which are superimposed on d-axis and q-axis currents, are 6 times, 12 times, and 18 times as large as the fundamental frequency. Those harmonic components of the electric motor are known to be different in amplitude and phase depending on the characteristics of the electric motor. For example, in one electric motor, the amplitude of a harmonic that is 6 times as large as a fundamental frequency may be larger than that of a harmonic that is 12 times as large as the fundamental frequency, but the amplitude of a harmonic that is 12 times as large as a fundamental frequency may be larger than that of a harmonic that is 6 times as large as the fundamental frequency in another electric motor having different characteristics. It is also known that the amplitude and phase characteristics of harmonics differ depending on the rotation speed of an electric motor.

In FIG. 4, an actual d-axis current value 401 matches a d-axis current value that is obtained when the carrier period division number N is set to infinity.

A d-axis current value 402, which is indicated by a filled-circle symbol "●", represents the above-mentioned k-th d-axis current value Id(k). A DC component is superimposed on the d-axis current due to the influence of aliasing, and a value deviated from the center value of the actual d-axis current value 401 is always detected. This is an erroneous detection.

A d-axis current 403, which is obtained in each measurement period and is indicated by an unfilled-circle symbol "○", represents the above-mentioned N d-axis currents Id(n) (1≤n≤N) (in a strict sense, the d-axis current 403 includes the d-axis current value 402 indicated by the filled-circle symbol "●"). In FIG. 4, the d-axis current value is obtained N times in the carrier period.

An average d-axis current value 404 is the average value of the d-axis current values Id(n), which are obtained in each measurement period, and represents the above-mentioned average d-axis current value Id_Ave. The average d-axis current value Id_Ave is calculated with use of the following expression, for example, based on the N d-axis current values Id(n), which are obtained in each measurement period.

$$Id\_Ave = \frac{1}{N}\sum_{n=1}^{N}(Id(n))$$

The average value Id_Ave of the d-axis current values Id(n), which are obtained in each measurement period, simulates the DC component of the actual d-axis current value 401 well.

A difference 405 represents the difference Id_Delta between the d-axis current value Id(k), which is obtained in each carrier period, and the average value Id_Ave of the d-axis current values Id(n), which are obtained in each measurement period, when the processing period of the current control unit 112 is the same as the carrier period. The difference 405 represents an error due to aliasing in the d-axis current Id(k), which is obtained in each carrier period.

The filtering section 206 performs the primary low-pass filtering on the d-axis current difference Id_Delta, for example, to thereby obtain the d-axis current correction value Id_Fix. Even when values greatly deviated from the actual d-axis current value due to noise or other factors are obtained as some d-axis current values of the N d-axis current values, the influence of the deviation on the d-axis current difference Id_Delta can be reduced through the primary low-pass filtering. Similar processing is performed for the q-axis current value.

The d-axis current correction value Id_Fix is used as a correction value for the d-axis current value Id(k), which is obtained in each carrier period. For example, the correction calculation section 207 adds or subtracts the d-axis current correction value Id_Fix to or from the d-axis current value Id(k), which is obtained in each carrier period. The corrected d-axis current Id serves as a d-axis current Id to be used by the current control unit 112. The current control unit 112 performs PI control so that the corrected d-axis current Id matches the d-axis current command value Id_ref, which is output from the current command generation unit 111. Similar processing is performed for the q-axis current.

Figure 5:
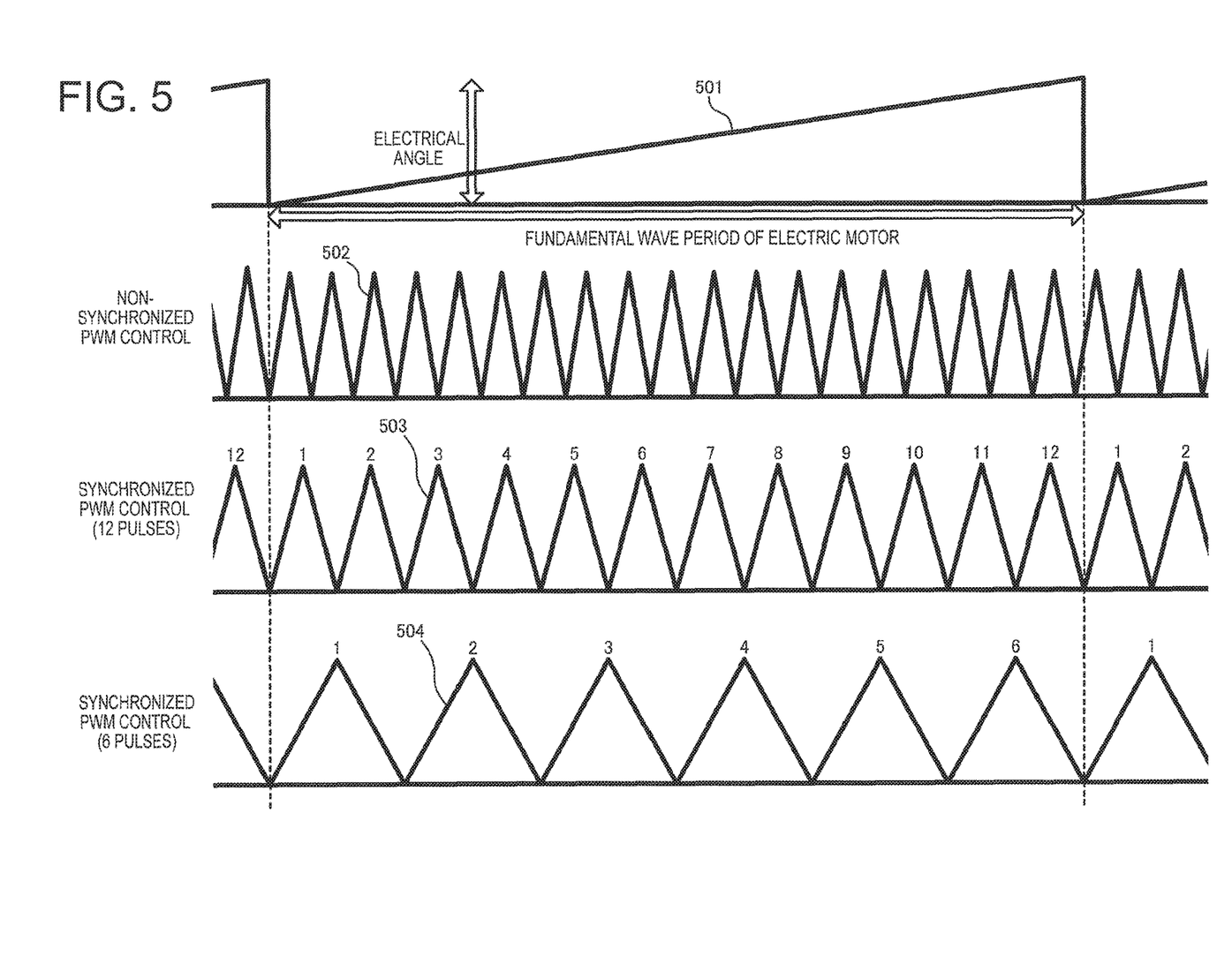
FIG. 5 is a chart for illustrating carrier periods of non-synchronized PWM control and synchronized PWM control in the first embodiment.

FIG. 5 is a chart for illustrating carrier periods of non-synchronized PWM control and synchronized PWM control in PWM control.

An electrical angle 501 of the electric motor 101 generally changes from 0 degrees to 360 degrees in one period. This is also referred to as "fundamental wave period".

The period of a carrier wave 502 in the non-synchronized PWM control is often set to a period that is sufficiently shorter than the fundamental wave period of the electric motor 101. The current control unit 112 and the voltage control unit 113 can execute the processing a large number of times in the fundamental wave period of the electric motor in this case, and hence satisfactory followability (controllability) with respect to the d-axis current command value Id_ref and the q-axis current command value Iq_ref, which are targets, is exhibited. However, the period of one carrier wave is short, and hence it is concerned that the processing capacity of a microcomputer may be insufficient depending on conditions, for example, the performance of the microcomputer.

A carrier wave 503, which is an example of the carrier wave in the synchronized PWM control, has 12 carrier periods in the fundamental wave period of the electric motor 101, that is, achieves 12-pulse control. The fact that the number of carrier waves per fundamental wave period of the electric motor is fixed means that the number of processing execution times of the current control unit 112 and the voltage control unit 113 per fundamental wave period of the electric motor 101 is fixed. In this case, certain controllability can be maintained over a wide rotation speed range that the electric motor 101 may take, but as the rotation speed of the electric motor 101 increases, the fundamental wave period of the electric motor 101 becomes shorter and a period per pulse (carrier wave) in the synchronized PWM control also becomes shorter. It is thus concerned that the processing capacity of the microcomputer may be insufficient depending on conditions as in the non-synchronized PWM control.

A carrier wave 504, which is another example of the carrier wave in the synchronized PWM control, has 6 carrier waves in the fundamental wave period of the electric motor 101, that is, achieves 6-pulse control. In order to solve the problem of the insufficient processing capacity of the microcomputer, which is described in relation to the carrier wave 502 and the carrier wave 503, it is desired that the number of pulses (the number of carrier waves) in the fundamental wave period of the electric motor 101 be changed appropriately in the synchronized PWM control. In changing the number of pulses, the rotation speed Rev of the electric motor 101 is preferably used as a reference.

However, as the number of pulses (number of carrier waves=carrier period division number N) in the fundamental wave period of the electric motor 101 decreases, a period (a period per pulse) in which the three-phase current value Iuvw is obtained, and the period of the harmonic component of the three-phase current becomes closer to each other. This results in a fear in that, in obtaining current, the influence of aliasing cannot be removed completely, and a value deviated from an actual value may be erroneously detected.

The occurrence of aliasing may be prevented when the number of times of obtaining the three-phase current value Iuvw in the carrier period increases as the carrier period division number N decreases. The number of times of obtaining the three-phase current value Iuvw is preferably set so as not to exceed the upper limit of the processing capacity of the microcomputer, for example.

In the configuration of the first embodiment, when the synchronized PWM control is selected, the influence of aliasing may be reduced or eliminated through division of the carrier period into N. An example of criteria for selection of the carrier period division number N is illustrated in FIG. 6.

Figure 6:
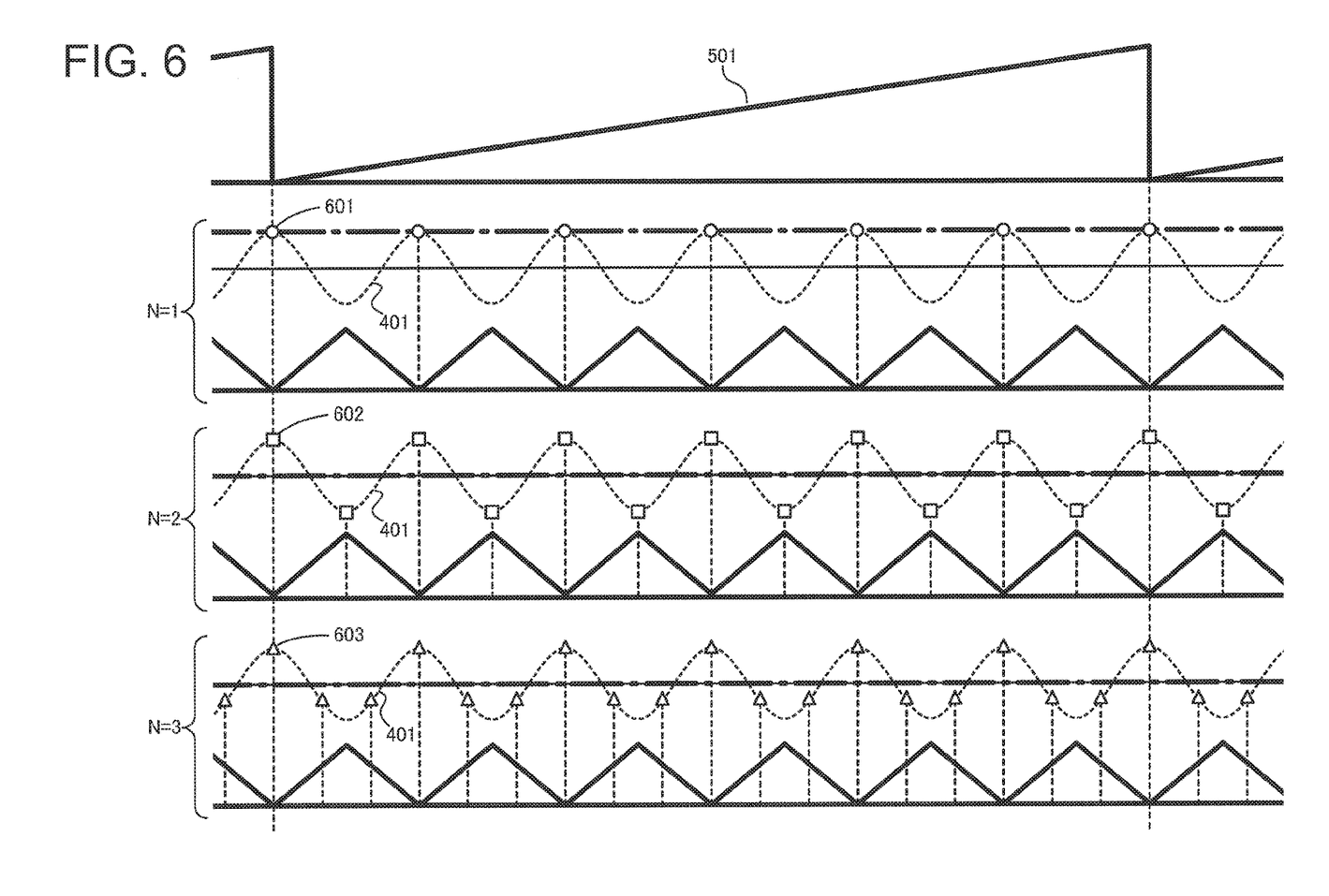
FIG. 6 is a chart for illustrating timings of obtaining the measurement value with different carrier period division numbers N in the first embodiment.

FIG. 6 is a chart for illustrating timings of obtaining the measurement value with different carrier period division numbers N in the first embodiment. With reference to FIG. 6, a description is given of a relationship between the harmonic component of the three-phase current, and the carrier period division number N with which the influence of aliasing due to the harmonic component can be effectively reduced or eliminated.

The example in FIG. 6 is a case in which 6-pulse control of the synchronized PWM control is used for a harmonic having a frequency that is 6 times as large as the fundamental frequency of the electric motor 101 (a period that is ⅙ of the fundamental wave period).

Aliasing occurs to be superimposed on the d-axis current and the actual d-axis current value 401 is generated as a result. In the comparative example in which N=1 is satisfied, which is not included in the present invention, a d-axis current value 601 indicated by an unfilled-circle symbol "○" is calculated in each carrier period. The d-axis current value 601 is affected by aliasing, and is thus deviated from the center value of the actual d-axis current value 401. The average value of the d-axis current values 601 (thick dashed-dotted line) is deviated from the average value of the actual d-axis current values 401 (indicated by the thin solid line).

In an example of the present invention in which N=2 is satisfied, a d-axis current value 602 indicated by an unfilled-square symbol "□" is calculated with a period that is half of the carrier period. The influence of aliasing can be reduced or eliminated through calculation of the average value of the d-axis current values 602. The average value of the d-axis current values 602 (thick dashed-dotted line) matches the average value of the actual d-axis current values 401 (indicated by the thin solid line).

In another example of the present invention in which N=3 is satisfied, a d-axis current value 603 indicated by an unfilled-triangle symbol "△" is calculated with a period that is ⅓ of the carrier period. The influence of aliasing can be reduced or eliminated through calculation of the average value of the d-axis current values 603. The average value of the d-axis current values 603 (thick dashed-dotted line) matches the average value of the actual d-axis current values 401 (indicated by the thin solid line).

The description about the d-axis current given above with reference to FIG. 6 is also applied to the q-axis current in the same manner.

It is found from the above that when the harmonic having the frequency that is 6 times as large as the fundamental frequency of the electric motor 101 (the period that is ⅙ of the fundamental wave period) is superimposed, the influence of aliasing can be reduced or eliminated by selecting the carrier period division number N=2 or N=3. In selecting the carrier period division number N, the carrier period division number N is preferably set to the smallest possible value in a range in which a similar effect can be achieved because the calculation load on the microcomputer increases as the value of the carrier period division number N increases. In a similar manner, there is an optimum carrier period division number N for enabling a reduction or elimination of aliasing also for the harmonic component that is 12 times or 18 times as large as the fundamental frequency of the electric motor.

For example, in a case in which a value obtained by dividing the order of a harmonic by the number of control pulses per fundamental wave period is an integer multiple of the carrier period division number N, the aliasing reducing effect is weaker than in a case in which the value in question is not an integer multiple of the carrier period division number N. More specifically, in the example of FIG. 6, the order of the harmonic is 6 and the number of control pulses per fundamental wave period is also 6, and hence the result of division between those values is 1. The aliasing reducing effect can thus be expected in both of a case in which N=2 is selected and a case in which N=3 is selected. In another example in which the order of a harmonic is 12 and the number of control pulses per fundamental wave period is 6, the result of division between those values is 2, which is an integer multiple of 2 but is not an integer multiple of 3. Thus, the aliasing reducing effect is weak when N=2 is selected, but the aliasing reducing effect can be expected when N=3 is selected. In still another example in which the order of a harmonic is 18 and the number of control pulses per fundamental wave period is 6, the result of division between those values is 3, which is not an integer multiple of 2 but is an integer multiple of 3. Thus, the aliasing reducing effect can be expected when N=2 is selected, but the aliasing reducing effect is weak when N=3 is selected.

The characteristics of the electric motor 101 are desirably considered as a selection criterion for the carrier period division number N in this case. For example, the waveforms of the three-phase current value of the electric motor 101 are obtained, and the Fourier transform is performed on the obtained waveforms to calculate the amplitude values of given harmonics (for example, harmonics having frequencies that are 6 times, 12 times, and 18 times as large as the fundamental frequency of the electric motor 101). Then, the carrier period division number N with which aliasing due to a harmonic having the largest amplitude value can be reduced is selected. Such operation may be executed by the drive control device 106, or by a separately provided individual component.

In selecting the carrier period division number N, one or both of the rotation speed Rev of the electric motor 101 and the number of pulses in the synchronized PWM control are desirably used as criteria. For example, the PWM control method selection unit 108 may calculate the carrier period division number N based on at least one of the number of carrier periods per fundamental wave period of the electric motor 101 or the rotation speed Rev of the electric motor 101.

In controlling the electric motor 101, which of the non-synchronized PWM control and the synchronized PWM control is selected as a control method, and the number of pulses are often determined depending on the rotation speed Rev of the electric motor 101. The period calculation section 201 thus selects the carrier period division number N based on the rotation speed Rev of the electric motor 101 or the control pulse number signal Pulse_Select in the synchronized PWM control, for example.

Figure 7:
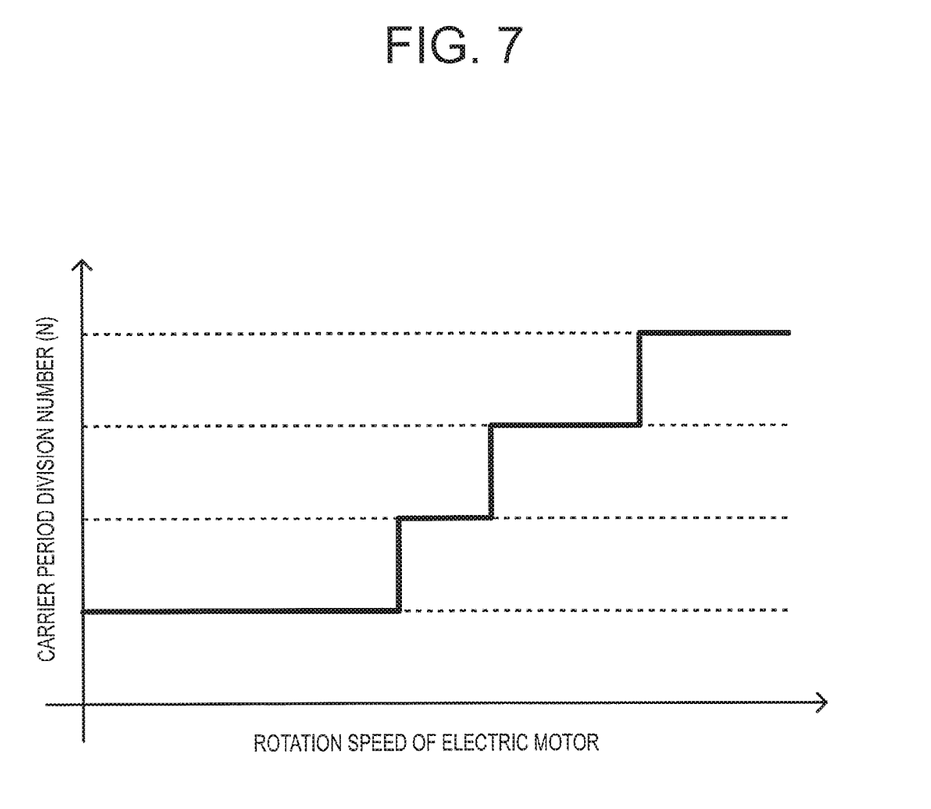
FIG. 7 is a chart for illustrating an example of a method of calculating the carrier period division number N in the first embodiment.

FIG. 7 is a chart for illustrating an example of a method of calculating the carrier period division number N in the first embodiment. The thick polyline represents a change in carrier period division number N, which depends on the rotation speed Rev of the electric motor. In this way, the carrier period division number N may be calculated with use of a one-dimensional map that uses the rotation speed Rev of the electric motor as input, for example. Alternatively, the carrier period division number N may be calculated or determined based on the PWM control method signal PWM_Select. Still alternatively, the carrier period division number N may be calculated or determined based on the control pulse number signal Pulse_Select. Yet alternatively, the carrier period division number N may be determined with use of a two-dimensional map obtained by combining the PWM control method signal PWM_Select and the control pulse number signal Pulse_Select.

It is known that the characteristics of the harmonic component of the fundamental frequency of the electric motor, which is superimposed on the three-phase current or the d-axis current (or the q-axis current), change depending on the characteristics and the rotation speed Rev of the electric motor 101. Thus, the influence of aliasing can be reduced while preventing an increase in processing load on the microcomputer as follows. The carrier period division number N that is effective for reducing aliasing is grasped in advance based on the characteristics and the rotation speed Rev of the electric motor 101, and values of the carrier period division number N suitable for various conditions are defined (for example, are stored in the information storage unit 120).

As described above, according to the control device for the electric motor of the first embodiment of the present invention, the influence of aliasing can be more appropriately reduced. For example, the influence of aliasing can be reduced without losing the control stability of the related-art current feedback control.

Further, the influence of aliasing can be reduced based on the characteristics of the electric motor.

Not only the low-pass filtering is performed on the average value of currents, but also the difference between the value after the low-pass filtering and the current values (k-th d-axis current value and k-th q-axis current value) at the particular timing is calculated as the correction value, and hence the present invention can be applied to more appropriate control.

For example, a delay that is generated in a current value (for example, d-axis current value 402) is reduced with the use of the difference as the correction value so that the responsiveness of the current feedback control can be enhanced. When the average d-axis current value Id_Ave and the average q-axis current value Iq_Ave are used as input for the feedback control, a delay is generated to take a moving average, which may deteriorate the responsiveness of the current feedback control. According to the first embodiment of the present invention, however, such a situation can be avoided.

Further, in the first embodiment, the responsiveness of the low-pass filtering is lower than the responsiveness of the current control unit, and hence the influence on the control response of the current feedback control in the current control unit 112 can be reduced. When the responsiveness of the low-pass filtering in the filtering section 206 is set to the responsiveness of the current control unit or higher, the d-axis current difference Id_Delta and the q-axis current difference Iq_Delta may fluctuate or may be sensitive to a disturbance (for example, value jumping in sampling). This may result in deterioration in controllability. According to the first embodiment, however, such a situation can be avoided. With regard to the followability of the current control with respect to the torque command value Trq_ref, the followability with respect to the torque command value Trq_ref is not improved even when the filtering section has responsiveness that is equal to or higher than the responsiveness of the current control because the responsiveness of the current control side may be a bottleneck.

The first embodiment of the present invention does not have a configuration in which a value after the low-pass filtering and a d-axis current (or q-axis current) obtained in each carrier period are simply added, and the result of addition is used as it is. Thus, the DC component is not doubled, and the control stability in the current control is not deteriorated.

Further, according to the first embodiment of the present invention, bypass filtering is not performed on detected currents, and hence a delay due to filtering can be reduced.

In the first embodiment, the PWM control method selection unit 108 may be omitted. In such a case, the current processing unit 109 and the current control unit 112 may be configured to always execute the synchronized PWM control, and the number of control pulses per fundamental wave period of the electric motor 101 may be fixed.

What is claimed is:
1. A control device for an electric motor, comprising:
   a drive control unit, which is configured to control an inverter configured to supply electric power to an electric motor, to thereby control drive of the electric motor;
   a rotation angle detection sensor, which is configured to detect a rotational position of the electric motor; and
   a current detection sensor, which is configured to detect, in each of three phases, a current value of a current that is supplied to the electric motor,
   the drive control unit including:
      a current control unit, which is configured to perform feedback control so that the detected current value follows a current command value;
      information storage unit, which is configured to store a first control period that is equal to a carrier period including a switching period of the inverter, and a second control period that is 1/N (N is an integer of 2 or more) of the first control period;

a measurement control unit, which is configured to obtain a three-phase current value of the inverter and the rotational position of the electric motor in each second control period; and a current processing unit, which is configured to perform calculation related to the current value, the current processing unit including:

a three-phase/two-phase conversion section, which is configured to perform three-phase/two-phase conversion on the three-phase current value and the rotational position that include successive N three-phase current values obtained with the second control period and successive N rotational positions obtained with the second control period, respectively, to output N d-axis current values and N q-axis current values;

an average value calculation section, which is configured to calculate an average value of the N d-axis current values and an average value of the N q-axis current values;

a difference calculation section, which is configured to:
calculate, as a d-axis current difference, a difference between a k-th d-axis current value (k is an integer satisfying 1≤k≤N) of the N d-axis current values that is obtained at a timing corresponding to the first control period, and the average value of the N d-axis current values; and
calculate, as a q-axis current difference, a difference between a k-th q-axis current value of the N q-axis current values that is obtained at a timing corresponding to the first control period, and the average value of the N q-axis current values;

a filtering section, which is configured to perform low-pass filtering on the d-axis current difference and the q-axis current difference to output a d-axis current correction value and a q-axis current correction value; and a correction calculation section, which is configured to:
perform a linear operation of the k-th d-axis current value and the d-axis current correction value to output the corrected d-axis current value; and
perform a linear operation of the k-th q-axis current value and the q-axis current correction value to output the corrected q-axis current value.

2. The control device for an electric motor according to claim 1,
wherein the drive control unit further includes a PWM control method selection unit, which is configured to perform PWM control on the inverter, to thereby control the electric motor, and
wherein the current control unit is configured to perform control based on control performed by the PWM control method selection unit.

3. The control device for an electric motor according to claim 2, wherein the PWM control method selection unit is configured to calculate N based on at least one of a number of the carrier periods per fundamental wave period of the electric motor or a rotation speed of the electric motor.

4. The control device for an electric motor according to claim 1, wherein the low-pass filtering achieves responsiveness that is lower than responsiveness of the current control unit.

5. The control device for an electric motor according to claim 2, wherein the low-pass filtering achieves responsiveness that is lower than responsiveness of the current control unit.

6. The control device for an electric motor according to claim 3, wherein the low-pass filtering achieves responsiveness that is lower than responsiveness of the current control unit.

* * * * *